United States Patent [19]

Lillquist et al.

[11] Patent Number: 4,477,712
[45] Date of Patent: Oct. 16, 1984

[54] ARC-WELDING SEAM-TRACKING APPLICATIONS EMPLOYING PASSIVE INFRARED SENSORS

[75] Inventors: Robert D. Lillquist; Carl M. Penney, both of Schenectady, N.Y.

[73] Assignee: General Electric Company, Schenectady, N.Y.

[21] Appl. No.: 371,708

[22] Filed: Apr. 26, 1982

[51] Int. Cl.³ .............................................. B23K 9/12
[52] U.S. Cl. ........................... 219/124.34; 219/130.01
[58] Field of Search ...................... 219/124.34, 124.22, 219/130.01, 130.21

[56] References Cited

U.S. PATENT DOCUMENTS

| | | | |
|---|---|---|---|
| 3,370,151 | 2/1968 | Normando | 219/124.34 |
| 3,666,949 | 5/1972 | DeFalco et al. | 219/130.21 |
| 3,819,902 | 6/1974 | Sidbeck et al. | 219/124.34 |
| 4,302,655 | 11/1981 | Edling | 219/130.32 |
| 4,316,075 | 2/1982 | Isoya et al. | 219/124.22 |
| 4,316,076 | 2/1982 | Balfanz | 219/124.22 |

FOREIGN PATENT DOCUMENTS

| | | | |
|---|---|---|---|
| 2749117 | 5/1979 | Fed. Rep. of Germany | 219/124.34 |
| 3030404 | 4/1982 | Fed. Rep. of Germany | |
| 901203 | 7/1962 | United Kingdom | 219/124.34 |
| 2045473 | 10/1980 | United Kingdom | 219/130.21 |
| 548392 | 4/1977 | U.S.S.R. | 219/124.34 |

OTHER PUBLICATIONS

"Development of Weld Pool Imaging Techniques For The Adaptive Control of Gas Tungsten Arc Welding", S. Hanumanth Rao, Thesis Presented to The Ohio State University, 1981.

Primary Examiner—C. C. Shaw
Attorney, Agent, or Firm—Lawrence D. Cutter; James C. Davis, Jr.; Marvin Snyder

[57] ABSTRACT

In an arc welding operation seam tracking is accomplished by determining the level of infrared radiation in a selected bandwidth, from at least two points lying in a direction forward of the arc torch travel and on opposite sides of the seam. Signal levels from the infrared detectors are compared and the difference signal is used to laterally position the arc torch. In this way, automatic seam tracking is accomplished thus facilitating robotic welding processes.

1 Claim, 5 Drawing Figures

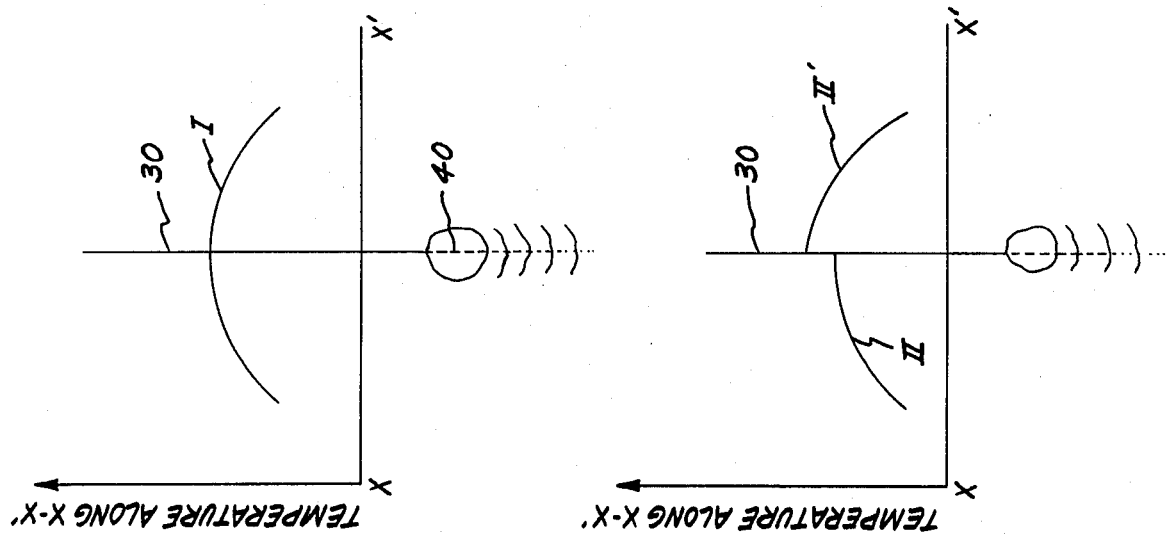
FIG. 2
FIG. 3
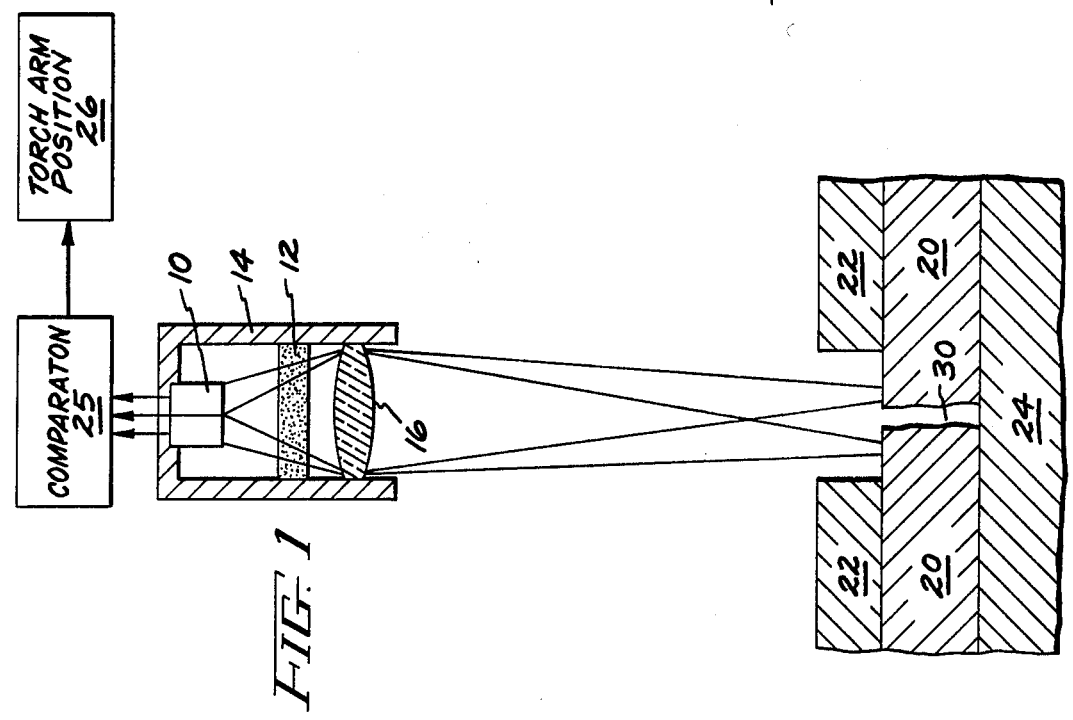
FIG. 1

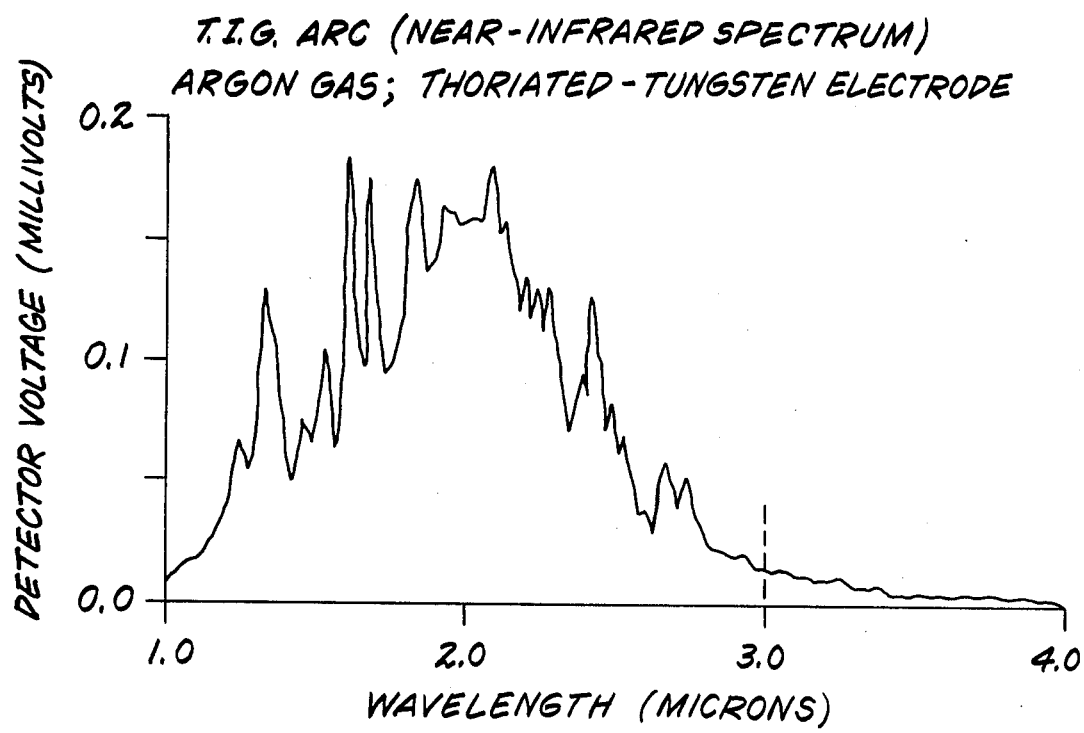
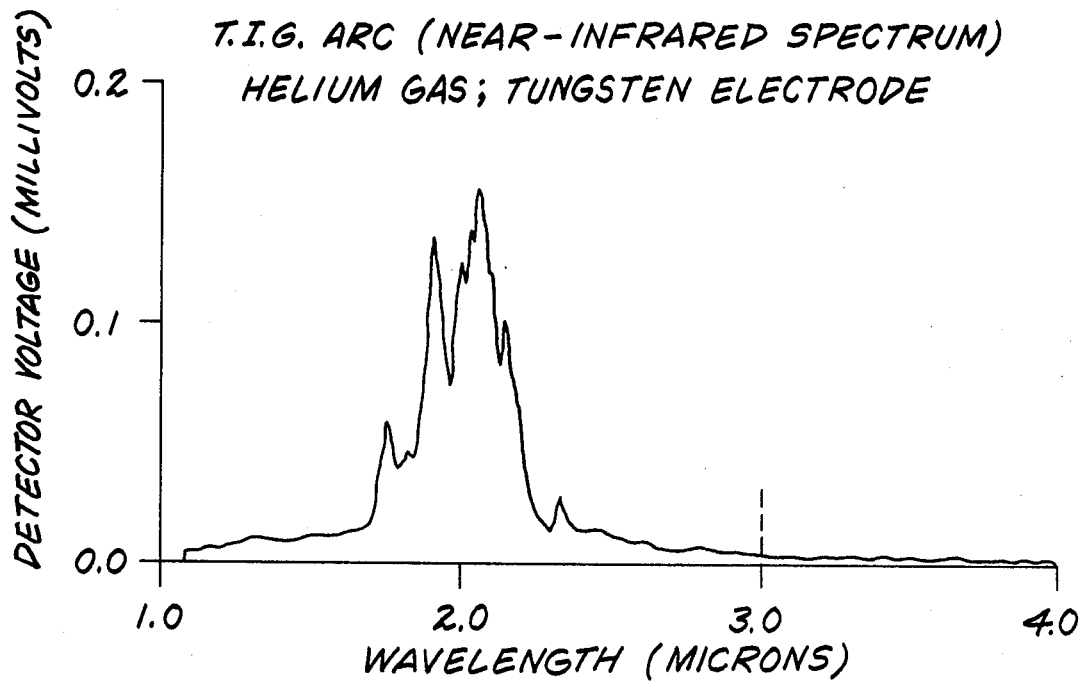

ARC-WELDING SEAM-TRACKING APPLICATIONS EMPLOYING PASSIVE INFRARED SENSORS

BACKGROUND OF THE INVENTION

This invention relates to a method of seam tracking in electric arc welding processes. More particularly, the present invention relates to a method employing infrared sensors capable of directly viewing the seam without interference from the arc radiation itself.

In arc welding processes, it is desirable to be able to move the electric arc welding torch along the seam to be welded. Furthermore, it is desirable that this be done automatically by the arc welding system. At present, most automated welding processes are limited to spot welding operations. However, continued development of automated welding processes, particularly those processes carried out by general purpose manufacturing robots, require certain feedback control structures and, in particular, structures which not only indicate the quality of the weld that is being made, but which also indicate the lateral position of the torch arm relative to the seam to be welded. In certain situations, seam tracking movements could be programmed into the welding system for predetermined seam position, curvature and dimension. However, it is much more desirable to be able to provide an electric arc welding system with means for automatically tracking the torch arm along the seam to be welded. It is further desired that this process occur continuously and automatically and that it be essentially undisturbed by the specific shape of the seam being welded.

More particularly, in automated welding, it is necessary to control the path of the welding arm so that the weld puddle remains centered on the weld seam. Moreover, although the general configuration of the seam in repetitive jobs can be programmed, fit variations from part to part are often sufficient to cause substantial deviations of the weld path from individual seams, resulting in poor welds. Accordingly, sensors are highly desirable which can determine the relative position of the weld puddle and the seam directly ahead of it, thereby providing a control signal which can be used to center the puddle. It is further desirable that the sensor be accurate to several mils, have a time response on the order of seconds or faster, sense the relative seam puddle position as close to the puddle as possible, operate from a working distance of several inches from the weld, all under the constraint of having only limited access to the workpiece. Furthermore, the sensor should work reliably in many different weld geometries and positions and be small, light and economical.

Several different forms of seam tracking apparatus have already been applied to guide automated and robotic welders. Among these devices are the mechanical contact type, such as "Cecil gauges", electromagnetic and electrostatic sensors, television viewers with signal processing electronics, and optical sensors using laser sources. Furthermore, sensors based upon the variation of arc parameters as the arc is zig-zagged slightly across the seam have also been employed. However, each of these previously described sensors fails to satisfy one or more of the above-mentioned desirable criteria.

Other work in this field has been reported in a progress report titled "Improvement of Reliability of Welding by In-process Sensing and Control (Development of Smart Welding Machines for Girth Welding of Pipes)" submitted to the Department of Energy in June, 1981 by José Converti et al. This report describes initial experiments conducted using contact sensors (thermocouples) to probe the temperature distribution near the weld puddle and seam. Attempts to use near infrared photodiodes, described therein, for remote temperature sensing were not successful due to significant optical interference from plasma radiation reflected from the metal surface. In particular, Converti et al. propose using a simple optical filter to reduce the radiation from the plasma arc through the use of materials similar to conventional welders' goggles.

However, one of the instant inventors has discovered that radiation from a tungsten inert gas (T.I.G.) welding arc is typically confined to a band having infrared radiation bandwidths below approximately 3 microns. This discovery has indicated that infrared sensors may be employable to probe the true surface temperature in the immediate vicinity of the weld puddle. Furthermore, tests conducted by the instant inventors indicate that such sensors provide the requisite temporal and resolution characteristics required in automated seam tracking welding processes.

SUMMARY OF THE INVENTION

In accordance with a preferred embodiment of the present invention, a method for seam tracking in a moving arc torch welding operation comprises the steps of determining the level of infrared radiation in the infrared band having wavelengths greater than about 3 microns, this radiation being determined for at least two points which are substantially equidistant from the welding seam, these points being further positioned on opposite sides of the weld seam in the direction of travel of the arc torch. The method further comprises comparing, by generating a difference signal, the level of infrared radiation in the selected band from opposite sides of the seam; this difference signal is used to laterally position the arc torch in such a way so as to reduce the difference signal.

Accordingly, it is an object of the present invention to provide an arc welding sensor for the generation of automatic seam tracking information.

It is also an object of the present invention to provide an automatic arc welding torch.

Lastly, it is an object of the present invention to provide a method for seam tracking in electric arc welding.

DESCRIPTION OF THE FIGURES

The subject matter which is regarded as the invention is particularly pointed out and distinctly claimed in the concluding portion of the specification. The invention, however, as to organization, method of practice, together with further objects and advantages thereof, may best be understood by reference to the following description taken in connection with the accompanying drawings in which:

FIG. 1 is a schematic side elevation view of the sensor of the present invention together with a view of the workpiece;

FIG. 2 is a combination plot and weld puddle view illustrating the temperature profile in a direction forward of the weld puddle;

FIG. 3 is a combination plot and weld puddle view similar to FIG. 2 and more particularly illustrating the effect on temperature distribution of weld puddle misalignment;

FIG. 4 is a graph of detector output voltage as a function of wavelength for a welding process employing argon gas in a thoriated tungsten electrode; and FIG. 5 is a graph similar to that shown in FIG. 4 for a welding process employing helium gas and a tungsten electrode.

DETAILED DESCRIPTION OF THE INVENTION

As is pointed out in concurrently-filed patent application Ser. No. 371,704 filed Apr. 26, 1982 (which is hereby incorporated herein by reference) torch side infrared measurements of the weld piece may be made through the use of conventionally available infrared detectors together with an optical filter for removing infrared wavelength radiation having wavelengths below approximately 3 microns. The use of such a filter very significantly reduces the level of dominant noise signal produced by the electric arc plasma itself. Furthermore, it has been further discovered by the present inventors that the unjoined seam beyond the weld puddle (that is, in the direction of motion of the welding torch) forms a strong barrier to thermal conduction. Accordingly, when the weld puddle is shifted off center, the thermal input to the workpiece is similarly shifted. Because of the shift and the conduction barrier, a temperature difference develops across the seam directly in front of the puddle. The temperature difference can be sensed by contacting means, such as by a thermocouple rake. Alternatively, in the preferred embodiment of the present invention, noncontacting infrared sensors positioned at a distance of several inches or more from the seam are employed. These sensors require only a narrow region of optical access to the seam itself. It is the desirability of mounting the sensor in close proximity to the plasma arc that makes the use of a spectrally limiting infrared filter particularly desirable.

A sensor in accordance with the present invention is illustrated in FIG. 1. In the particular embodiment shown, infrared detector 10 includes two distinct detector cells. One cell is responsive to infrared radiation impinging upon it from one side of the weld seam; the other detector is responsive to infrared radiation from a corresponding spot on the other side of the seam. Since the unjoined seam gap 30 in workpiece 20 forms a strong barrier to thermal conduction, variations in weld pool position cause the electrical outputs from detector 10 to differ. This difference is generated by comparator 25 which provides a positioning control signal to torch arm positioner 26. Furthermore, it should be pointed out that while FIG. 1 illustrates a two-element sensor 10, it is also possible to employ multi-element infrared detectors having, for example, between 8 and 128 separate detector cell areas. In such a case, it is possible to generate signal information indicative of the temperature profile across the unjoined seam portion. It is also equally possible to compute a plurality of difference signals which may be computationally combined in various weighted fashions to provide an indication of temperature imbalance across the unjoined seam. This imbalance information may be similarly employed to control torch arc positioner 26.

Sensors in accordance with the present invention should be sensitive to infrared radiation having a wavelength greater than about 3 microns. For example, a useful detector sensitivity range extends from about 3 to about 7 microns. The detector should also preferably operate stably at temperatures near or slightly above room temperature. Several specific forms of detector may be employed, none of which require cooling, such as by cryogenic liquids, for their operation. In particular, detector 10 may comprise a multielement self-scanning pyroelectric linear array detector such as those available from Spiricon, Inc., 2600 North Main, Logan, Utah 84321. These linear detector arrays are particularly useful for providing temperature profile information. This profile information may be employed to determine temperature imbalance and is particularly useful for welds between thin sheets of material. Additionally, each of the elements in detector 10 may comprise a single element photoconductive-type detector employing lead selanide or indium antimonide photoconductor materials. Such single element detectors may be employed to receive infrared radiation from a fixed point in front of the weld pool on one side of the seam and is particularly useful for monitoring high penetration welds. However, single element pyroelectric detectors may also be employed for this purpose. Lastly, detector 10 may comprise a two-dimensional array pyroelectric cell scanning or photoconductive-type detector. Such detectors are preferable for certain special purpose applications where it is desirable to obtain high resolution thermal data from the entire region in front of the weld zone.

Much of the success of the instant seam tracking sensor is attributable to the fact that it is a torch side instrument. Such instruments generally lack the ability to provide significant levels of thermal data resolution because of the extremely bright and intense infrared radiation produced by the arc itself. This radiation is of such high intensity that it effectively overwhelms all other infrared radiation signals produced. However, one of the instant inventors has discovered that for a number of different welding processes, the bandwith of the infrared radiation generated within the arc is limited to wavelengths below approximately 3 microns. Accordingly, applicants' invention employs filter 12 which selectively passes infrared radiation having wavelengths greater than about 3 microns. In this way, infrared noise, from the arc, is very greatly attenuated. The presence of filter 12 permits the entire weld pool region to be monitored without significant interference from the arc. Filter 12 may comprise an infrared long pass filter with a lower cut-on wavelength of between 3 or 4 microns. Additionally, filter 12 may comprise a bandpass-type filter transmitting infrared radiation having wavelengths of between about 3 and about 7 microns. Additionally, it should also be noted that infrared radiation having wavelengths up to about 14 microns contains useful information about the nature of the thermal temperature distribution across the unjoined weld seam.

Furthermore, the sensor of the present invention includes housing 14 in which detector 10 and filter 12 are mounted as shown in FIG. 1. Furthermore, focusing lens 16 is employed to produce a sharp image of workpiece 20 on sensor 10. Lens 16 may be of the fixed or variable focus variety. Similarly as pointed out in the application concurrently filed herewith, reflective (Cassegrain), rather than transmissive, optical systems may be employed for this purpose. Additionally, as shown in FIG. 1, it is seen that workpiece 20 is held in place on table 24 by means of clamp 22.

The temperature measurement of the present invention is typically made in a direction perpendicular to the weld seam along a line such as X—X' seen in FIGS. 2 and 3. This line is located across an unjoined portion of weld seam 30 in front of weld pool 40 which moves along the seam. Curve I in FIG. 2 illustrates the temperature profile along line X—X'. FIG. 2 particularly illustrates the temperature distribution situation in the event that the weld pool 40 is centered on seam 30. In the event that weld pool 40 shifts to the right, even slightly, the temperature profile along line X—X' is particularly affected. Accordingly, there is a significant difference in temperature profile on opposite sides of seam 30 because of larger thermal input on one side of the seam. The instant inventors have observed that this effect arises because of the thermal barrier formed by weld seam 30 itself. Advantage is taken of this phenomenon to control torch positioning and hence weld pool position. In particular, in FIG. 3 it is seen that a slight shift of weld pool 40 to the right has caused a difference between temperature profile curves II and II', as shown. Accordingly, spot measurements at substantially equidistant points from the seam are sufficient to indicate shifting of the weld pool to the right or to the left, and are thus sufficient to activate corrective lateral torch positioning.

The instant arc welding sensor exhibits particular advantages because of the presence of infrared filter 12. As pointed out above, one of the instant inventors has observed that in several different welding processes, infrared radiation from the arc itself is confined to a relatively narrow band of spectral frequencies. While the specific frequency band varies somewhat with the specific electrode and inert gas employed, it has been generally found that the infrared radiation produced by the electrode arc generally does not exhibit wavelengths greater than approximately 3 microns. In particular, FIG. 4 illustrates a plot of detector output voltage (in millivolts) as a function of wavelength for a tungsten inert gas (TIG) arc. In particular, the inert gas employed was argon, and the electrode material employed was thoriated tungsten. A similar plot is shown in FIG. 5 which illustrates the near infrared spectral distribution of a tungsten inert gas arc in which the inert gas employed was helium and the electrode material consisted essentially of tungsten. Again, it is seen that the infrared radiation from the arc itself is definitely bandwidth limited, centered around a wavelength of about 2 microns, and extends from about 1½ to about 2½ microns. Thus, for this form of inert gas arc welding an even wider bandwidth filter 12 may be employed.

Accordingly, it is seen from the above that a major concern relating to the strong radiation source provided by the electric plasma arc, and even by the molten puddle itself, have been avoided. Sensor proximity to the arc and puddle is desirable not only because it facilitates tracking sudden changes in seam direction, but also because the time response to the temperature difference to puddle displacement is approximately proportional to the square of the distance from the puddle to the sensing point. This time response also depends, albeit to a lesser degree, on the thermal conductivity and specific heat of the workpiece. Typically, a distance of 0.5" corresponds to a time response on the order of 1 second.

It should also be noted that the sensor of the present invention need only be able to accurately monitor the surface temperature difference across the seam rather than the absolute surface temperature. Thus, a relatively simple optical system may be employed to achieve the desired results. In cases where the weldment exhibits either a very low or highly variable infrared emissivity, it may be necessary to paint both sides of the seam. For this purpose, ordinary machinist's marking dye may be employed.

From the above, it should be appreciated that the present invention provides an economical yet reliable sensor and method for positioning an electric arc welding torch. Furthermore, it is seen that this positioning is readily adaptable to track almost all smoothly varying seam configurations after initial setup, without subsequent operator intervention.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for seam-tracking along a workpiece in a moving arc torch welding operation comprising the steps of:
   determining the level of emitted infrared radiation in the infrared radiation band having wavelengths greater than about 3 microns, said infrared radiation being determined for at least two points which are substantially equidistant from said seam, said points being positioned on opposite sides of said seam with respect to the direction of travel of said arc torch;
   comparing, by generating a difference signal, the level of emitted infrared radiation in said band from said opposite sides of said seam; and
   laterally positioning said arc torch so as to reduce the level of said difference signal.

* * * * *